US008687572B2

(12) United States Patent
Park

(10) Patent No.: US 8,687,572 B2
(45) Date of Patent: Apr. 1, 2014

(54) TECHNIQUES FOR PRIMARY CHANNEL SELECTION FOR AN 802.11AC WIRELESS NETWORK OPERATING ADAJACENT TO AN 802.11N WIRELESS NETWORK

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 12/875,198

(22) Filed: Sep. 3, 2010

(65) Prior Publication Data
US 2012/0057534 A1 Mar. 8, 2012

(51) Int. Cl.
*H04W 40/00* (2009.01)
*H04W 72/04* (2009.01)
*H04L 12/26* (2006.01)
*H04B 7/00* (2006.01)
*H04W 28/04* (2009.01)
*H04L 12/56* (2006.01)
*H04W 48/16* (2009.01)

(52) U.S. Cl.
CPC ............. *H04W 28/04* (2013.01); *H04L 47/10* (2013.01); *H04W 48/16* (2013.01)
USPC ............ 370/329; 370/252; 370/343; 455/515

(58) Field of Classification Search
USPC ......... 370/203, 252, 338, 343, 315, 327–334; 455/63.3, 68, 41.2, 500–528, 450
See application file for complete search history.

(56) References Cited

U.S. PATENT DOCUMENTS

| 2005/0124294 | A1* | 6/2005 | Wentink | 455/41.2 |
| 2006/0159003 | A1* | 7/2006 | Nanda et al. | 370/203 |
| 2009/0067403 | A1* | 3/2009 | Chan et al. | 370/343 |
| 2009/0080388 | A1* | 3/2009 | Rohfleisch et al. | 370/338 |
| 2009/0285116 | A1* | 11/2009 | Nanda et al. | 370/252 |
| 2011/0096747 | A1* | 4/2011 | Seok | 370/329 |
| 2012/0052900 | A1* | 3/2012 | Liu et al. | 455/515 |

OTHER PUBLICATIONS

Noh et al, "Channel selection and management for 11ac" "doc.:IEEE 802.11-10/0593r0", Date May 19, 2010.*
International Search Report and Written Opinion Received for PCT Application No. PCT/US2011/046897, mailed on Feb. 9, 2012, 9 pages.

* cited by examiner

*Primary Examiner* — Wing F Chan
*Assistant Examiner* — Raji Krishnan
(74) *Attorney, Agent, or Firm* — Ellis B. Ramirez; Prass LLP

(57) ABSTRACT

An embodiment of the present invention provides an apparatus, comprising a transceiver capable of communicating in a first basic service set (BSS) of a wireless network that is operable adjacent to a second basic service set (BSS) of wireless network, wherein when the first BSS and the second BSS operate such that the first BSS and the second BSS contain channels that at least partially overlap, the transceiver selects a primary channel of the first BSS to be next to a primary channel of the second BSS so that the first and the second BSSs avoid collisions with each other due to the at least partial overlapping.

8 Claims, 2 Drawing Sheets

US 8,687,572 B2

TECHNIQUES FOR PRIMARY CHANNEL SELECTION FOR AN 802.11AC WIRELESS NETWORK OPERATING ADAJACENT TO AN 802.11N WIRELESS NETWORK

BACKGROUND

Wireless networks are now pervasive and vital in society. Wireless networks may transmit and receive information utilizing varying techniques. For example, but not by way of limitation, two techniques are those that conform to the Institute for Electronic and Electrical Engineers (IEEE) 802.11ac standard and those that operate in accordance with the IEEE 802.11n standard. Such distinct wireless networks may have channels overlapping and therefore a need exists for techniques for primary channel selection in such wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
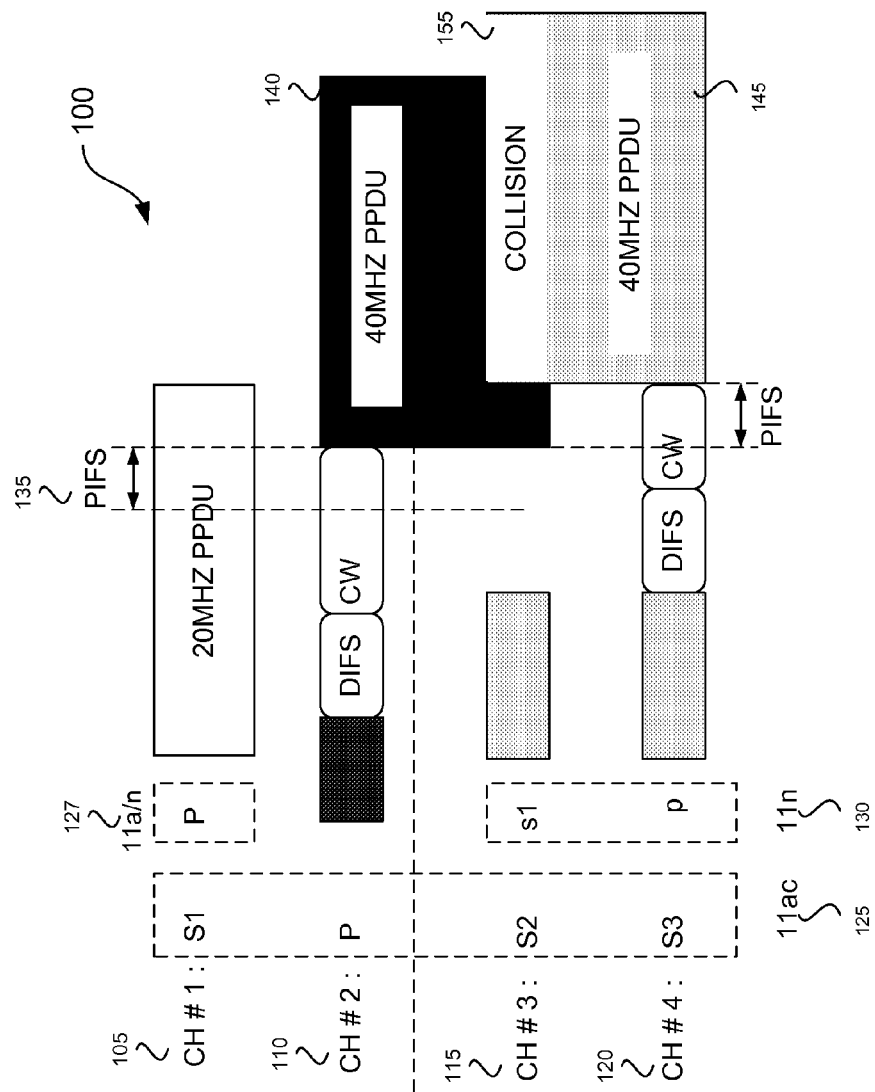
FIG. 1 illustrates a 40 MHz channel partial overlapping problem between 802.11n and 802.11ac.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

In wireless networks that may conform to the Institute for Electronic and Electrical Engineers (IEEE) 802.11ac standard and those that operate in accordance with the IEEE 802.11n standard an 802.11ac, an 80 MHz Physical Protocol Data Unit (PPDU) transmission is proposed, utilizing four 20 MHz channels to increase the data rate. One of the four channels is assigned as a primary channel that can perform full Carrier Sense Multiple Access/Collision Avoidance (CSMA/CA) and the Network Allocation Vector (NAV) tracking and the rest of three channels are assigned as secondary channels that only have capability of CCA (clear channel assessment). In 802.11ac, all the transmissions will include the primary channel since only the primary channel can perform the full CSMA/CA. The following acronyms are used throughout this document: PIFS Point Coordination Function Interframe Space; SIFS Short Interframe Space; CW Contention Window; BSS basic service set; and DIFS digital interframe space.

Different CCA mechanisms have different levels of sensitivity. For example, 802.11n employs energy detection mechanisms to detect signals in the secondary channel with received energy greater than the energy detection threshold (e.g. −62 dBm). The preamble detection or the guard interval detection has better signal detection sensitivity and is typically much more sensitive than the energy detection scheme (i.e. 20 dB better sensitivity).

The 802.11ac device may transmit 20 MHz or 40 MHz or 80 MHz PPDUs utilizing one or two or four 20 MHz channels depending on the availability of the channels. The availability of the channels is determined by the result of CCA. For 20 MHz transmissions, the primary channel used may be for a 20 MHz PPDU transmission. For 80 MHz PPDU transmissions, all four channels are used. For 40 MHz PPDU transmissions, however, there can be multiple choices depending on the location of the primary channel. If the primary channel is in the middle of the four channels, there can be two choices for the 40 MHz PPDU transmissions. Using the two middle channels for the 40 MHz PPDU transmissions, however, crosses the 40 MHz channel boundary and the transmissions can partially overlap in the frequency domain with another nearby 40 MHz PPDU transmissions of an 802.11n device.

This is illustrated in FIG. 1, shown generally as 100, and depicts an example of the 40 MHz channel partial overlapping problem. In the example, there are three BSSs (reference number 125 is the 802.11ac BSS, 127 is the 802.11a/n BSS, and 130 is the 802.11n BSS) located close to each other with the following conditions: received signal strength is above the preamble detection or the guard interval detection (i.e. >−82 dBm) but below the energy detection level (i.e. <−62 dBm): 1) 20/40 MHz 802.11n BSS using Ch#3 115 and Ch#4 120 (Ch#4: primary channel, Ch#3: secondary channel); 2) 20/40/80 MHz 802.11ac BSS using all four channels Ch#1-4 105, 110, 115 and 120 (Ch#2:primary channel 110); and 3) 20 MHz 802.11a/n BSS using Ch#1 105.

802.11ac BSS is only allowed to transmit 20 MHz or 40 MHz or 80 MHz PPDUs. When the back-off counter of the 802.11ac BSS expires in the primary channel (Ch#2) 110, the 802.11ac device checks the secondary channels to see if the channels were idle for at least PIFS 135 time before the back-off timer expiration. Assuming the guard interval detection is used for the 802.11ac, the 802.11ac device can detect that Ch#1 105 is busy and the rest of the secondary channels idle and starts to transmit 40 MHz PPDU 140 on Ch#2 110 and Ch#3 115. The 802.11n device, however, only has capability of energy detection in its secondary channel and unable to detect the 802.11ac's 40 MHz PPDU 140 transmission on Ch#3 115 and starts to transmit 40 MHz PPDU 145 on Ch#3 115 and Ch#4 120 and causes a collision 155 between the 40 MHz PPDU 140 transmission of 802.11ac and that of 802.11n 145.

Embodiments of the present may include: 1) The primary channel selection algorithm that allows 40 MHz PPDU transmission across the 40 MHz channel boundary in the 5 GHz band without the 40 MHz channel partial overlapping problem; and 2) An algorithm that decides when to enable or disable the 40 MHz PPDU transmission across the 40 MHz channel boundary.

Further, embodiments of the present invention may provide that the primary channel selection algorithm selects a channel that is next to the neighboring 40 MHz 802.11n BSS's primary channel to be the 802.11ac's primary channel. This prevents collisions between 802.11n and 802.11ac due to the 40 MHz channel partial overlapping problem.

Figure 2:
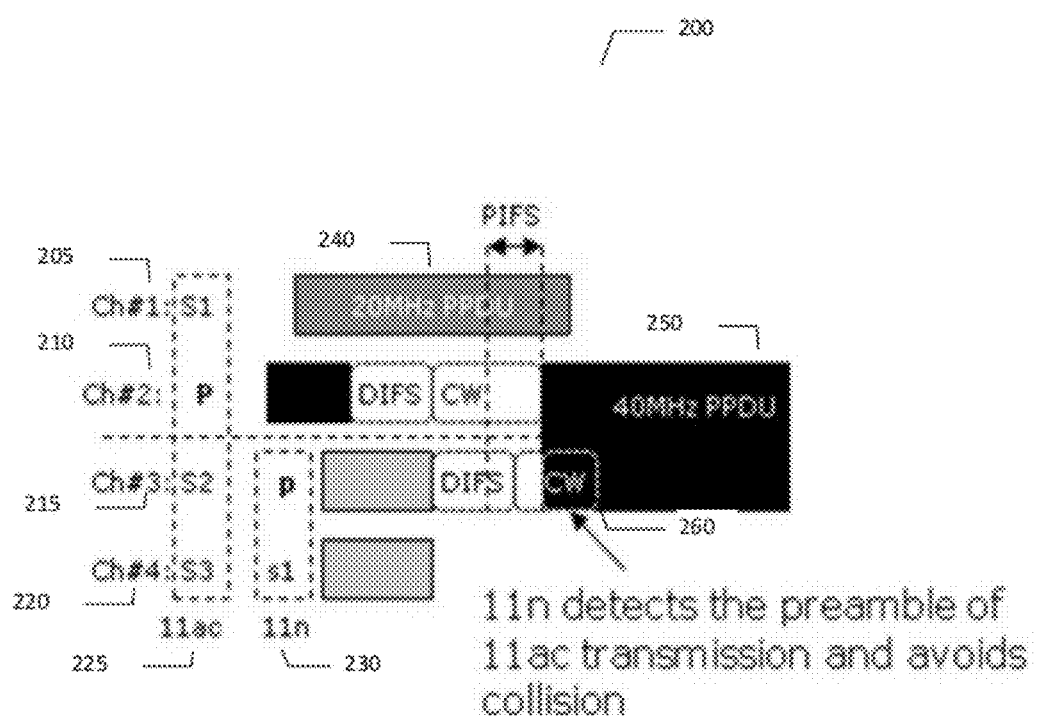
FIG. 2 depicts the primary channel selection according to embodiments of the present invention.

Turning now to FIG. 2, there is illustrated a primary channel selection technique according to embodiments of the present invention. In FIG. 2, shown generally as 200, collision prevention is provided, wherein the primary channels of 802.11n (Ch#3) 215 and 802.11ac (Ch#2) 210 are next to each other. Assuming Ch#1 205 is busy and the 802.11ac device 225 first accesses Ch#2 210 and Ch#3 215 for a 40 MHz PPDU 250 transmission upon the backoff timer expires. Since the primary channel of the 802.11n device 230 is Ch#3 215, the 802.11n device 230 can detect the 40 MHz PPDU 250 transmission on Ch#3 215 by detecting the preamble 260 of the 40 MHz PPDU 250 and can avoid a collision.

Although not limited in this respect, one way to implement this algorithm is as follows:

Step 1: The 802.11ac AP first scans the 5 GHz band for four contiguous empty channels for 80 MHz PPDU transmissions. If there are four empty channels available, use those for the BSS operation. If there are fewer than four empty channels, select the four channels that have least active BSSs.

Step 2: If there is a 40 MHz 802.11n BSS operating in the selected four channels, scan for the primary channel of the neighboring 40 MHz BSS. If possible, select a channel that's next to the primary channel of the 40 MHz 802.11n BSS as the primary channel of the 802.11ac BSS's primary channel.

Step 3: If the 802.11ac AP can select the primary channel that is next to the primary channel of the 802.11n BSS, then enable 40 MHz PPDU transmissions across the 40 MHz channel boundary; otherwise disable the 40 MHz PPDU transmissions across the 40 MHz channel boundary.

By enabling the 40 MHz PPDU transmission across the 40 MHz channel boundary, 802.11ac devices can increase the throughput by up to 20% (when three secondary channels are loaded by 80%) compared to the case where the 40 MHz PPDU transmission across the 40 MHz channel boundary is not allowed. The gain comes from the fact that the 802.11ac device can transmit 40 MHz PPDUs either using Ch#1 and Ch#2 or Ch#2 and Ch#3, whereas there is only one choice of transmitting 40 MHz PPDUs using Ch#1 and Ch#2 if the boundary crossing is not allowed.

Yet another embodiment of the present invention provides a method utilized by the present invention and may comprise operating a transceiver capable of communicating in a first basic service set (BSS) of a wireless network that is operable adjacent to a second basic service set (BSS) of the wireless network, wherein when the first BSS and the second BSS operate such that the first BSS and the second BSS contain channels that at least partially overlap, the transceiver selects a primary channel of the first BSS to be next to a primary channel of the second BSS so that the first and the second BSSs avoid collisions with each other due to the at least partial overlapping.

Still another embodiment of the present invention may provide a wireless network access point (AP), comprising a transceiver capable of communicating in a first basic service set (BSS) of a wireless network that is operable adjacent to a second basic service set (BSS) of the wireless network, wherein when the first BSS and the second BSS operate such that the first BSS and the second BSS contain channels that at least partially overlap, the transceiver selects a primary channel of the first BSS to be next to a primary channel of the second BSS so that the first and the second BSSs avoid collisions with each other due to the at least partial overlapping.

Yet another embodiment of the present invention may provide a computer readable medium encoded with computer executable instructions, which when accessed, cause a machine to perform operations comprising operating a transceiver capable of communicating in a first basic service set (BSS) of a wireless network that is operable adjacent to a second basic service set (BSS) of the wireless network, wherein when the first BSS and the second BSS operate such that the first BSS and the second BSS contain channels that at least partially overlap, the transceiver selects a primary channel of the first BSS to be next to a primary channel of the second BSS so that the first and the second BSSs avoid collisions with each other due to the at least partial overlapping.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

I claim:

1. An apparatus, comprising:
   a transceiver capable of communicating in a first basic service set (BSS) of a wireless network that is operable adjacent to a second basic service set (BSS) of said wireless network, wherein the transceiver has instructions to perform primary channel selection according to an algorithm wherein:
   IF the first BSS and the second BSS contain 40 MHz channels that at least partially overlap, THEN selecting a primary channel of said first BSS to be next to a primary channel of said second BSS so that said first and said second BSSs avoid collisions with each other due to said at least partial overlapping;
   wherein said transceiver is operable as an Access Point (AP) of said first BSS and operates conforming to an Institute for Electronic and Electrical Engineers (IEEE) 802.11 ac standard and said second BSS operates conforming to an IEEE 802.11n standard;
   wherein said AP of said 802.11 ac BSS first scans a 5 GHz band for four contiguous empty channels for 80 MHz PPDU transmissions and if there are four contiguous empty channels available, said AP uses those four contiguous empty channels for said first BSS operation and if there are fewer than four contiguous empty channels, said AP selects four contiguous channels that have least active BSSs;
   wherein, if there is a 40 MHz 802.11n BSS operating in said selected four channels, said AP scans for a primary channel of the 40 MHz 802.11n BSS and if possible selects a channel that is next to said primary channel of the 40 MHz 802.11n BSS as the primary channel of the 802.11 ac BSS;

wherein if said 802.11ac AP can select a primary channel that is next to a primary channel of said 802.11n BSS then said AP enables 40 MHz PPDU transmissions across a 40 MHz channel boundary, otherwise said AP disables said 40 MHz PPDU transmissions across said 40 MHz channel boundary.

2. The apparatus of claim 1, wherein the primary channel selection algorithm utilizes two adjacent 20 MHz channels to allow 40 MHz PPDU transmissions across the 40 MHz channel boundary in the 5 GHz band.

3. A method comprising:
operating a transceiver capable of communicating in a first basic service set (BSS) of a wireless network that is operable adjacent to a second basic service set (BSS) of said wireless network,
operating the transceiver to perform primary channel selection according to an algorithm wherein:
IF the first BSS and the second BSS contain 40 MHz channels that at least partially overlap, THEN selecting a primary channel of said first BSS to be next to a primary channel of said second BSS so that said first and said second BSSs avoid collisions with each other due to said at least partial overlapping;
operating said transceiver as an Access Point (AP) of said first BSS and conforming to an Institute for Electronic and Electrical Engineers (IEEE) 802.11ac standard and said second BSS operates conforming to an IEEE 802.11n standard;
wherein said AP of said 802.11ac BSS first scans a 5 GHz band for four contiguous empty channels for 80 MHz PPDU transmissions and if there are four empty channels available, said AP uses those four contiguous empty channels for said first BSS operation and if there are fewer than four contiguous empty channels, said AP selects four contiguous channels that have least active BSSs;
wherein, if there is a 40 MHz 802.11n BSS operating in said selected four channels, said AP scans for a primary channel of the 40 MHz 802.11 BSS and if possible selects a channel that's next to said primary channel of the 40 MHz 802.11n BSS as the primary channel of the 802.11ac BSS;
wherein if said 802.11ac AP can select a primary channel that is next to the primary channel of said 802.11n BSS then said AP enables 40 MHz PPDU transmissions across a 40 MHz channel boundary, otherwise said AP disables said 40 MHz PPDU transmissions across said 40 MHz channel boundary.

4. The method of claim 3, wherein the primary channel selection algorithm utilizes two adjacent 20 MHz channels to allow 40 MHz PPDU transmissions across the 40 MHz channel boundary in the 5 GHz band.

5. A non-transitory computer readable medium encoded with computer executable instructions, which when accessed, cause a machine to perform operations comprising:
operating a transceiver capable of communicating in a first basic service set (BSS) of a wireless network that is operable adjacent to a second basic service set (BSS) of said wireless network,
operating the transceiver to perform primary channel selection according to an algorithm wherein:
IF the first BSS and the second BSS contain 40 MHz channels that at least partially overlap, THEN selecting a primary channel of said first BSS to be next to a primary channel of said second BSS so that said first and said second BSSs avoid collisions with each other due to said at least partial overlapping;
operating said transceiver as an Access Point (AP) of said first BSS and conforming to an Institute for Electronic and Electrical Engineers (IEEE) 802.11ac standard and said second BSS operates conforming to an IEEE 802.11n standard;
wherein said AP of said 802.11ac BSS first scans a 5 GHz band for four contiguous empty channels for 80 MHz PPDU transmissions and if there are four empty channels available, said AP uses those four contiguous empty channels for said first BSS operation and if there are fewer than four contiguous empty channels, said AP selects four contiguous channels that have least active BSSs;
wherein, if there is a 40 MHz 802.11n BSS operating in said selected four channels, said AP scans for a primary channel of the 40 MHz 802.11n BSS and if possible selects a channel that is next to said primary channel of the 40 MHz 802.11n BSS as the primary channel of the 802.11 ac BSS;
wherein if said 802.11ac AP can select a primary channel that is next to the primary channel of said 802.11n BSS then said AP enables 40 MHz PPDU transmissions across a 40 MHz channel boundary, otherwise said AP disables said 40 MHz PPDU transmissions across said 40 MHz channel boundary.

6. The non-transitory computer readable medium encoded with computer executable instructions of claim 5, wherein the primary channel selection algorithm utilizes two adjacent 20 MHz channels to allow 40 MHz PPDU transmissions across the 40 MHz channel boundary in the 5 GHz band.

7. A wireless network access point (AP), comprising:
a transceiver capable of communicating in a first basic service set (BSS) of a wireless network that is operable adjacent to a second basic service set (BSS) of said wireless network, wherein the transceiver performs primary channel selection according to an algorithm wherein:
IF the first BSS and the second BSS contain 40 MHz channels that at least partially overlap, THEN selecting a primary channel of said first BSS to be next to a primary channel of said second BSS so that said first and said second BSSs avoid collisions with each other due to said at least partial overlapping;
wherein said AP of the first BSS operates conforming to an Institute for Electronic and Electrical Engineers (IEEE) 802.11ac standard and said second BSS operates conforming to an IEEE 802.11n standard;
wherein said AP of said 802.11 ac BSS first scans a 5 GHz band for four contiguous empty channels for 80 MHz PPDU transmissions and if there are four empty channels available, said AP uses those for said first BSS operation and if there are fewer than four empty channels, said AP selects four channels that have least active BSSs;
wherein, if there is a 40 MHz 802.11n BSS operating in said selected four channels, said AP scans for a primary channel of the 40 MHz 802.11n BSS and if possible selects a channel that is next to said primary channel of the 40 MHz 802.11n BSS as the primary channel of the 802.11ac BSS;
wherein if said 802.11ac AP can select a primary channel that is next to the primary channel of said 802.11n BSS then said AP enables 40 MHz PPDU transmissions across a 40 MHz channel boundary, otherwise said AP disables said 40 MHz PPDU transmissions across said 40 MHz channel boundary.

8. The method of claim 7, wherein the primary channel selection algorithm utilizes two adjacent 20 MHz channels to allow 40 MHz PPDU transmissions across the 40 MHz channel boundary in the 5 GHz band.

* * * * *